United States Patent [19]

Poignant et al.

[11] 3,900,308

[45] Aug. 19, 1975

[54] HERBICIDAL MONO AND DISUBSTITUTED AMIDES OF PHENOXYALIPHATIC CARBOXYLIC ACIDS

[75] Inventors: Pierre Poignant, Lyon; Pierre Delage, Lentilly, both of France

[73] Assignee: Pechiney Progil, France

[22] Filed: May 25, 1972

[21] Appl. No.: 256,652

Related U.S. Application Data

[63] Continuation-in-part of Ser. No. 862,026, Sept. 29, 1969, abandoned.

[52] U.S. Cl. .............................. 71/118; 260/559 B
[51] Int. Cl. .............................................. A01n 9/20
[58] Field of Search ....................................... 71/118

[56] References Cited
UNITED STATES PATENTS

| | | | |
|---|---|---|---|
| 2,412,510 | 12/1946 | Jones .................................. | 71/118 |
| 3,439,018 | 4/1969 | Brookes et al. ...................... | 71/108 |
| 3,480,671 | 11/1969 | Tilles .................................. | 260/559 |
| 3,557,209 | 1/1971 | Richter et al. ...................... | 71/118 |

FOREIGN PATENTS OR APPLICATIONS

| | | | |
|---|---|---|---|
| 1,600,445 | 7/1970 | France ................................ | 71/118 |

*Primary Examiner*—James O. Thomas, Jr.
*Attorney, Agent, or Firm*—Robert E. Burns; Emmanuel J. Lobato; Bruce L. Adams

[57] ABSTRACT

The herbicide compositions contain as active material, amides of phenoxyaliphatic carboxylic acids having the following formula,

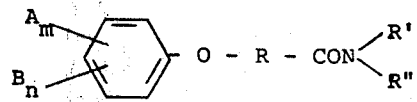

wherein
R is a linear, or branched alkylene radical containing from 1 to 5 carbon atoms,
R' is a hydrogen, or an alkyl radical containing from 1 to 5 carbon atoms,
R" is an alkenyl or alkyl radical containing up to 5 carbon atoms,
A is halogen,
B is an alkyl radical, which contains from 1 to 3 carbon atoms, and may carry halogen substituents,
$m$ and $n$ are integers of 0 to 3, $m + n$ being no more than 3 and the substituents being carried on the phenyl radical at positions 2, 3, 5 and 6, provided that when $n = 1$ and at the same time $m = 0$, B is not fixed at position 2 on the phenyl radical.

17 Claims, No Drawings

HERBICIDAL MONO AND DISUBSTITUTED AMIDES OF PHENOXYALIPHATIC CARBOXYLIC ACIDS

This is a continuation-in-part of our copending U.S. application Ser. No. 862,026, filed on Sept. 29, 1969 and now abandoned.

The present invention relates to herbicide compositions and more particularly to herbicides in which the active material comprises one amide of phenyloxycarboxylic acids or a mixture of such compounds having the formula, $$A_m\text{-}C_6H_3\text{-}B_n\text{-}O\text{-}R\text{-}CON{<}^{R'}_{R''}$$

wherein
- R is a linear, or branched alkylene radical containing from 1 to 5 carbon atoms,
- R' is a hydrogen, or an alkyl radical containing from 1 to 5 carbon atoms,
- R'' is an alkenyl or alkyl radical containing up to 5 carbon atoms,
- A is halogen,
- B is an alkyl radical which contains from 1 to 3 carbon atoms and may carry halogen substituents,
- $m$ and $n$ are integers of 0 to 3, $m + n$ being no more than 3 and the substituents being carried on the phenyl radical or position 2, 3, 5 and 6, provided that when $n = 1$ and $m = 0$, B is not fixed at position 2 on the phenyl radical.

It has long been known to use aryloxyaliphatic carboxylic acids and certain derivatives thereof as selective herbicides.

As a matter of fact, the first studies of such compounds date from about 1940 and as a result, numerous herbicides adapted in particular to be used against adventitious dicotyledons in crops of Graminae, namely cereals such as wheat, barley and oats, and in some tropical crops, such as rice and sugar cane, have been developed.

The most important representatives of this family of herbicides, the practical importance of which has been essential, are:
- 2,4-dichlorophenoxyacetic acid, or 2,4 D
- 2-methyl-4-chlorophenoxyacetic acid, or MCPA
- 2,4,5-trichlorophenoxyacetic acid, or 2,4,5 T
- 2(2,4-dichlorophenoxy)propionic acid, or dichloroprop
- 2(2-methyl4-chlorophenoxy)propionic acid, or mecoprop
- 2(2,4,5-trichlorophenoxy)propionic acid, or fenoprop Other compounds in the same family, in particular, those in which the phenoxy radical is monosubstituted in the 4 position are also known as herbicides, but in practice have found only little use.

There is extensive literature concerning these products which teaches that these compounds act like the natural auxins upon cell growth, causing the cells to proliferate, which results in deformation of the leaves and stems, atrophy of the roots, and death of the plant.

Some of these "synthetic auxins" or "phytohormones" are endowed with selective properties which enable them to be used as herbicides after the crops have sprung up.

In practical use, phytohormones are seldom used in their acid state, but nearly always as alkaline salts of amines, esters and unsubstituted amides ($CO-NH_2$).

As a matter of fact, the various forms of phytohormones show just about similar herbicide activities, but different physicochemical properties, in particular with regard to solubility and vapor pressure, so that either of such forms may be preferred depending on the kind of cleaning to be carried out. But the various forms may be considered as nearly similar as far as the type of action and the selectivity are concerned.

Applicants have not discovered that converting certain of the known acid herbicides into N-mono- or disubsituted amides produces compounds which are also herbicides, but which have an activity spectrum which, surprisingly, is generally essentially different from the starting phytohormone.

Thus, in particular, the present herbicides which generally are used before the plants spring up are active principally on Graminae and may also show activity with respect to dicotyledons but are generally selective for other species of these two classes such as, for example, Cruciferae, in particular, turnips, Solanae such as tomatoes, and Graminae such as wheat, maize and barley.

The substituted amides, the herbicide properties of which are revealed by this invention, are prepared by known processes such as:

The action of an ester of a phenoxyaliphatic carboxylic acid on a mono- or disubstituted amine.

The action of the acid itself on a mono- or disubstituted amine and heat dehydration of the amine salts obtained.

The action of an acid or a salt of an aryloxyaliphatic carboxylic acid on a carbamoyl halide (French Patent No. 1,426,086).

By way of non-limiting examples of compounds useful as herbicides according to the present invention, the following products, set forth in Table 1, can be mentioned in particular.

Table 1

| No. | A | B | R | R' | R'' |
|---|---|---|---|---|---|
| 1 | H | H | $CH_2$ | H | $CH_3$ |
| 2 | H | H | $CH_2$ | $CH_3$ | $CH_3$ |
| 3 | H | H | $CH_2$ | $C_2H_5$ | $C_2H_5$ |
| 4 | H | H | $CH_2$ | Allyl | Allyl |
| 5 | 3—Cl | H | $CH_2$ | $CH_3$ | $CH_3$ |
| 6 | 6—Cl | 2—$CH_3$ | $CH_2$ | $CH_3$ | $CH_3$ |
| 7 | 2—Cl | 3—$CH_3$ | $CH_2$ | $CH_3$ | $CH_3$ |
| 8 | 2—5—$Cl_2$ | H | $CH_2$ | $CH_3$ | $CH_3$ |
| 9 | 2—6—$Cl_2$ | H | $CH_2$ | $CH_3$ | $CH_3$ |
| 10 | 2—3—6—$Cl_3$ | H | $CH_2$ | $CH_3$ | $CH_3$ |
| 11 | H | H | $CH-(CH_3)$ | $CH_3$ | $CH_3$ |
| 12 | H | 3—$CH_3$ | $CH-(CH_3)$ | $CH_3$ | $CH_3$ |
| 13 | H | 2—5($CH_3)_2$ | $CH-(CH_3)$ | $CH_3$ | $CH_3$ |
| 14 | 2—5—$Cl_2$ | H | $CH-(CH_3)$ | $CH_3$ | $CH_3$ |
| 15 | 2—3—6—$Cl_3$ | H | $CH-(CH_3)$ | $CH_3$ | $CH_3$ |
| 16 | 2—Cl | H | $CH(CH_3)$ | H | $CH_3$ |
| 17 | 2—Cl | H | $C(CH_3)_2$ | $CH_3$ | $CH_3$ |
| 18 | 2—Cl | H | $C(CH_3)_2$ | $C_2H_5$ | $C_2H_5$ |
| 19 | 2—Cl | H | $C(CH_3)_2$ | $CH_3$ | Allyl |

Table 1-Continued

| No. | A | B | R | R' | R'' |
|---|---|---|---|---|---|
| 20 | 2—3—Cl$_2$ | H | CH(CH$_3$) | H | CH$_3$ |
| 21 | 2—3—Cl$_2$ | H | CH(CH$_3$) | CH$_3$ | CH$_3$ |
| 22 | 2—3—Cl$_2$ | H | CH(CH$_3$) | C$_2$H$_5$ | C$_2$H$_5$ |
| 23 | 2—5—Cl$_2$ | H | CH$_2$ | CH$_3$ | nC$_3$H$_7$ |
| 24 | 2—5—Cl$_2$ | H | CH(CH$_3$) | H | CH$_3$ |
| 25 | 2—5—Cl$_2$ | H | —CH(CH$_3$) | CH$_3$ | nC$_3$H$_7$ |
| 26 | 2—5—Cl$_2$ | H | —CH(CH$_3$) | CH$_3$ | allyl |
| 27 | 2—5—Cl$_2$ | H | —CH(CH$_3$) | CH$_3$ | isoC$_4$H$_9$ |
| 28 | 2—5—Cl$_2$ | H | —CH(CH$_3$) | CH$_3$ | secC$_4$H$_9$ |
| 29 | 3—5—Cl$_2$ | H | —CH(CH$_3$) | H | CH$_3$ |
| 30 | 3—5—Cl$_2$ | H | —CH(CH$_3$) | CH$_3$ | CH$_3$ |
| 31 | 3—5—Cl$_2$ | H | —CH(CH$_3$) | C$_2$H$_5$ | C$_2$H$_5$ |
| 32 | 3—Cl | H | —CH(CH$_3$) | H | CH$_3$ |
| 33 | 3—Cl | H | —CH(CH$_3$) | CH$_3$ | CH$_3$ |
| 34 | 3—Cl | H | —CH(CH$_3$) | C$_2$H$_5$ | C$_2$H$_5$ |
| 35 | 2—5Cl$_2$ | H | —CH(CH$_3$) | C$_2$H$_5$ | C$_2$H$_5$ |
| 36 | 2—5Cl$_2$ | H | —CH(CH$_3$) | CH$_3$ | nC$_4$H$_9$ |

While all the compounds corresponding to the above formula and in particular, those mentioned in the above table, show advantageous herbicide properties, the preferred compounds of the present invention are those for which the positions of the phenyl nucleus substituents are different from the positions found in conventional phytohormones, such as 2, 4 D, MCPA, 2, 4, 5 T, and the homologs thereof belonging to series of phenoxy-2-propionic acids.

More precisely, the preferred positions for the phenyl nucleus substituents are as follows:
With mono-substitution: 2 or 3
With disubstitution: 2- 3, 2 - 5, 3 - 5
With trisubstitution: 2 - 3 - 5

As a matter of fact, applicants' work has revealed that the most active compounds should include one unsubstituted hydrogen atom in the alpha position on the phenyl nucleus. Among the preferred compounds of the present invention are those wherein R is 1 or 2, i.e. alkyl and dialkylacetamides and propionamides and dialkyl propionamides are particularly preferred.

The following compounds may be mentioned as especially advantageous:
2-(2-chlorophenoxy)-N,N-dimethylpropionamide
2-(2,5-dichlorophenoxy)-N,N-dimethylpropionamide
2-(2,5-dimethylphenoxy)-N,N-dimethylpropionamide.

The herbicide properties of the compounds according to this invention have been brought out by numerous tests carried out in a greenhouse on 16 plant species representing the crops and both moncotyledonous and dicotyledonous weeds.

Unless otherwise specified, said tests were carried out in the following way:

Seeds of the species concerned were sown in pots and then covered with an adequate amount of earth to insure the good germination thereof.

The pots were then treated with a wettable powder containing the active material to be tested, the formulation dilution being calculated in a manner such that the amount of active material supplied be equivalent to 8 kg./Ha.

The results were noted 35 days after said treatment.

An untreated control plant for each species was kept next to each test series.

The main species used in said tests are indicated hereafter (the letter between brackets in front of the name of each species is the abbreviation used for the species in the tables appearing further on).

| | | |
|---|---|---|
| (A) | Oat | (Avena sativa) |
| (B) | Wheat | (Triticum vulgare) |
| (M) | Maize | (Zea mays) |
| (Mi) | Bird Seed | (Panicum miliaceum) |
| (O) | Barley | (Hordeum distichum) |
| (P) | Panic grass | (Panicum-Echinochloa crusgalli) |
| (R) | Rye grass | (Lolium italicum) |
| (V) | Black grass | (Alopecurus agrestis) |
| (C) | Carrot | (Daucus carotta) |
| (H) | Bean | (Phaseolus vulgaris) |
| (L) | Flax | (Linum usitatissimum) |
| (N) | Turnip | (Brassica napus) |
| (Po) | Pea | (Pisum sativum) |
| (S) | Buckwheat | (Polygonum fagopyrum) |
| (Tom) | Tomato | (Lycopersicum esculentum) |
| (Tou) | Sunflower | (Helianthus annuus) |
| (RZ) | Rice | (Oryza sativa) |
| (AM) | Pigweed | (Amarantus sp.) |
| (Bet) | Sugar beet | (Beta Vulgaris) |
| (CH) | Lamb's quarter | (Chenopodium sp.) |
| (MO) | White mustard | (Sinapis alba) |

The variety of uses for the compounds according to this invention is illustrated by the following examples, giving a general idea of the activity range of some of the products the weed killing applications of which are set forth in the present description.

EXAMPLE 1

Compound No. 1 is absolutely selective on Graminae such as maize and on dicotyledons such as tomatoes, peas, beans, flax and turnips, while it destroys entirely, or limits very efficiently, the growth (°) of Graminae such as bird seed and rye grass. (°) destruction rate ranging from 80 to 100%, which will correspond hereinafter to "active on".

EXAMPLE 2

Compound No. 3 is absolutely selective on crops such as tomatoes, sunflowers, turnips and flax, while it is active on dicotyledons such as carrot and Graminae such as bird seed, panic grass, rye grass and black grass.

EXAMPLE 3

Compound No. 7 is selective on crops both of dicotyledons, such as tomatoes and of Graminae, such as wheat and maize, and is active on Graminae such as bird seed, panic grass, rye grass and black grass, and on dicotyledons such as carrots and flax.

EXAMPLE 4

Compound Nos. 16, 17, 18 and 19, at the rate of 4 kg./ha, completely destroy Graminae such as cereal crops, barnyard grass, rye grass, rice, blackgrass and wild spring oat. They are also very active on broad leaf weeds, such as carrot, lamb's quarter, flax, French bean (except compound 19), white mustard, pea and buckwheat. It should be noted that compounds 17, 18 and 19 are selective on tomato and sunflower and compound 19 is also selective on French bean.

EXAMPLE 5

Compound Nos. 20, 21 and 22 completely destroy at the rate of 8 kg./ha, Graminae such as wheat, oat, maize, barley, barnyard grass, rye grass, rice sorghum, blackgrass. On the other hand, at the same rate, compound 20 destroys broad leaf weeds such as pigweed, carrot and lamb's quarter, but is nearly inactive on the other tested species.

Compound Nos. 21 and 22 are nearly inactive on the tested broad leaf weeds, except on pea for compound 22.

EXAMPLE 6

Compound No. 23, at the rate of 4 kg./ha, completely destroys Graminae such as maize, barley, barnyard grass, rye grass, rice sorghum and black grass, when it is selective on pigweed, peanut, carrot, French bean, flax, soybean and sunflower.

EXAMPLE 7

Compound No. 24 completely destroys, at the rate of 4 kg./ha, all the tested Graminae, but it is selective on French bean, buckwheat, tomato and sunflower.

EXAMPLE 8

Compound No. 25, at the rate of 4 kg./ha, completely destroys cereal crops, barnyard grass, rye grass and blackgrass, but is nearly inactive on most of the broad leaf weeds.

EXAMPLE 9

Compound 26, at the rate of 4 kg./ha, completely destroys Graminae such as wheat, oat, barley, maize, rye grass, sorghum and blackgrass, but it is inactive on peanut sugar beet, French bean, buckwheat, soybean, tomato and sunflower.

EXAMPLE 10

Compound 27 and 28, at the rate of 8 kg./ha, are active on Graminae such as wheat, oat, barnyard grass, rye grass, rice and blackgrass, but they are selective on pigweed, buckwheat and nearly inactive on sugar beet and wild mustard.

EXAMPLE 11

Compounds 29 to 31, at the rate of 8 kg./ha, completely destroy Graminae such as oat, wheat, rice, maize and also barnyard grass, rye grass and blackgrass, when they are inactive on pigweed, sugar beet and wild mustard.

EXAMPLE 12

Compounds 32 to 34, at a rate of 4 kg./ha, destroy with at least 75% Graminae such as maize, rice and also rye grass and black grass, when they are inactive on dicotyledons such as cotton, cleaver, haricot, flax, buckwheat, tomato and sunflower.

EXAMPLE 13

Compounds 35 and 36, at a rate of 4 kg./ha destroy completely Graminae such as oat, barley, sorghum, barnyard grass, rye grass, wild oat and foxtail when they are inactive on dicotyledons such as pigweed, ground nut, lamb's quarter, rape, haricot, pea, buckwheat, tomato and sunflower.

EXAMPLE 14

This example shows one of the essential findings of the present invention, to wit, the important difference in herbicide activity between the starting phytohormones (used as unsubstituted amides) and compounds of the invention, that is, the N-mono- or N,N-dialkylated amides.

The differences have been brought out by systematic comparative tests on the unsubstituted amide of a given acid, and the corresponding N,N-disubstituted amide. Roman numerals have been used throughout to designate comparative compounds. The results are shown in Table 2.

Table 2

| Compounds Tested 8 kg./Ha | Nature of the Plant Species | | | | | | | | | | | | | | |
|---|---|---|---|---|---|---|---|---|---|---|---|---|---|---|---|
| | A | B | M | Mi | O | P | R | V | C | H | L | N | Po | S | Tom | Tou |
| I * | 0 | 0 | | 70 | 0 | 15 | 85 | — | 100 | 100 | 90 | 95 | 100 | 60 | 70 | 50 |
| 11 * | 100 | 75 | | 100 | 98 | 55 | 95 | — | 95 | 40 | 0 | 0 | 95 | 20 | 0 | 0 |
| II * | 0 | 0 | 0 | 100 | 0 | 50 | 70 | 95 | 100 | 100 | 100 | 100 | 100 | 90 | 60 | 90 |
| 14 * | 100 | 95 | 100 | 100 | 100 | 100 | 100 | 100 | 100 | 5 | 15 | 0 | 0 | 70 | 0 | 0 |

* I = 2-(Phenoxy)propionamide
* 11 = 2-Phenoxy-N,N-dimethylpropionamide
* II = 2-(2,5-Dichlorophenoxy)propionamide
* 14 = 2-(2,5-Dichlorophenoxy)-N,N-dimethylpropionamide

EXAMPLE 15

This example also shows the unexpected difference in activity of the present substituted amides compared to the unsubstituted compounds. The herbicidal properties of 2-chlorophenoxypropionamide (III) and its N-monomethyl derivative (compound 16) have been compared. Both of the compounds were applied at a rate of 2 kg./ha and the results are set forth in Table 3.

Table 3

| Species Compounds | Graminae | | | | | | | Dicotyledons | | | |
|---|---|---|---|---|---|---|---|---|---|---|---|
| | A | B | P | R | RZ | V | AM | Bet | CH | MO | S |
| III | 0 | 0 | 10 | 60 | 95 | 0 | 95 | 95 | 95 | 90 | 90 |
| 16 | 85 | 80 | 60 | 95 | 98 | 30 | 50 | 70 | 30 | 60 | 30 |

As is evident from the data in this example, the spectrum of the herbicidal activity of compound 16 is quite different and in fact, the reverse of that of the corresponding unsubstituted amide.

Compound III has a very limited action on Graminae and a complete one on dicotyledons, whereas compound 16 has a substantially better activity on Graminae than on dicotyledons, i.e. which gives a spectrum inverse to that of compound III.

EXAMPLE 16

Another example which illustrates the surprising difference in activity of the present compounds compared to the corresponding unsubstituted amide is shown by N-monomethyl-2-(2,5-dichlorophenoxy)propionamide (compound 24) compared to the corresponding unsubstituted amide (compound IV). Both compounds were applied at a rate of 4 kg./ha, on six species of Graminae, namely oat, maize, panic grass, rye-grass (*lolium multiflorum*) and black-grass and on six dicotyledons on various species, namely carrot, haricot (*Phaseolus vulgaris*), flax, white mustard (*Sinapis alba*), buckwheat and tomato. This activity is expressed by the average percentage of destruction, on one hand on Graminae, on the other hand on dicotyledons in Table 4.

Table 4

| Compound | % Activity on Graminae | % Activity on dicotyledons |
|---|---|---|
| IV | 25 | 85 |
| 24 | 97 | 45 |

Here also the N-monomethyl substituted amide, according to the invention, is active overall on Graminae, whereas the non-substituted corresponding compound has an activity mainly on dicotyledons.

EXAMPLE 17

This example demonstrates the advantage provided by the preferred substitutions mentioned hereinabove and, in particular, the superiority of the compounds of this invention with respect to 2,4-derivatives disubstituted on the phenyl nucleus, such as those mentioned in particular in the Australian Patent No. 49,319/61 to Boots Pure Drug Co., wherein, in particular, mono- and disubstituted amides of (methyl-2, chloro-4 phenoxy)acetic or propionic acids are claimed.

This example shows quite well that the disubstituted amide derivatives which have on the phenyl nucleus the most usual substituents for the conventional herbicide phytohormones, that is, in the 2, 4-position, which is the case in 2, 4 D, dichloroprop, MCPA, and mecoprop, the compounds are:

either not very active, or unactive (compound V), or have an activity very similar to that of the starting phytohormones, in that they are mainly active on dicotyledons (compounds VI and VII).

On the contrary, this example clearly shows the activity already mentioned of the compounds according to the invention (Nos. 13 and 14) which makes them particularly useful against Graminae in dicotyledon crops.

EXAMPLE 18

Compound 14, the herbicide activity of which has been shown in Example 17 for a proportion of 8 kg./Ha. was tested in lower proportions, which the following results:

in an amount of 2 kg./Ha, this compound is selective on dicotyledons such as beets, beans, flax, turnips, buckwheat, tomatoes, and sunflowers, and 100% active on all Graminae tested.

In an amount of 1 kg./Ha, its selectivity is obviously maintained, and its activity is still complete on ryegrass, black grass, barley, bird seed, and oats, and very substantial (75-80% destruction) on wheat and panic grass.

This compound is therefore particularly advantageous against Graminae for cleaning very many dicotyledon crops.

EXAMPLE 19

This example illustrates the outstanding herbicidal characteristics of a substituted amide of 2-chlorophenoxy propionic acid and the fact that it is substantially more effective than the corresponding 2-substituted amide of 2-methylphenoxy propionic acid. N,N-Dimethyl(2-chlorophenoxy)-2-propionamide (compound 17) and N,N-dimethyl(2-methylphenoxy)-2-propionamide (compound VIII) were each applied at the rate of 8 kg./ha to a variety of Graminae and dicotyledones and the results are shown in Table 6.

Table 5

| Products Used 8 kg./Ha | Nature of the Plant Species | | | | | | | | | | | | |
|---|---|---|---|---|---|---|---|---|---|---|---|---|---|
| | A | B | M | O | P | R | V | H | L | N | Po | S | Tom | Tou |
| V * | 0 | 0 | 0 | 0 | 20 | 20 | 40 | 0 | 0 | 0 | 0 | 20 | 0 | 0 |
| VI * | 0 | 0 | 0 | 0 | 85 | 15 | 70 | 15 | 30 | 98 | 100 | 25 | 25 | 0 |
| VII * | 0 | 0 | 0 | 0 | 20 | 30 | 0 | 15 | 50 | 65 | 100 | 60 | 0 | 0 |
| 13 * | 100 | 80 | 0 | 100 | 100 | 100 | 100 | 0 | 0 | 0 | 0 | 0 | 0 | 0 |
| 14 * | 100 | 95 | 100 | 100 | 100 | 100 | 100 | 5 | 15 | 0 | 0 | 70 | 0 | 5 |

* V = N, N -Dimethyl(2,4-dimethylphenoxy)-2-propionamide
* VI = N, N-Dimethyl(2-methyl-4-chlorophenoxy)-2-propionamide (Boots)
* VII = N, N -Dimethyl(2,4-dichlorophenoxy)-2-propionamide
* 13 = N,N-Dimethyl(2,5-dimethylphenoxy)-2-propionamide
* 14 = N, N-Dimethyl(2,5-dichlorophenoxy)-2-propionamide

Table 6

| Tested Compounds 8 kg./ha | A | B | M | O | P | R | Species V | C | H | L | PO | S | TOM | TOU |
|---|---|---|---|---|---|---|---|---|---|---|---|---|---|---|
| VIII | 85 | 60 | 60 | 100 | 95 | 100 | 100 | 100 | 15 | 0 | 85 | 0 | 0 | 0 |
| 17 | 100 | 100 | 90 | 100 | 100 | 100 | 85 | 100 | 100 | 100 | 100 | 90 | 100 | 98 |

As is evident from the above data, compound 17 is surprisingly more effective on Graminae and also has a better action on dicotyledones than compound VIII.

EXAMPLE 20

The compounds according to the invention were also tested in the open air, in order to ascertain their selectivity and herbicide action under normal conditions of use.

To this end, the product according to the invention were converted into wettable powders containing 20% of active material by thoroughly mixing the following component for one minute on a knife mill.

| Product to be tested | 20% |
|---|---|
| Deflocculating agent (Ca lignosulfate) | 5% |
| Wetting agent (Na alkylarylsulfonate) | 1% |
| Filler (alumina silicate) | 74% |

The resulting wettable powder is then diluted to obtain a concentration corresponding to the amount of active material to be supplied per hectare.

Under such conditions, the N,N-dimethyl- and diethylamides of 2-(2,5-dichlorophenoxy)-propionic acid, applied for treating Summer Rape before same spring up and in amounts ranging from 1 to 3 kg./ha, destroy completely adventitious plants such as black grass, rye grass (*Lolium sp*), annual meadow grass (*Poa annua*) loose silky bent grass (*Agrostis Spice-Venti*), wild camomile (*Matricaria sp*), as well as many other species, both graminaceous and dicotyledonous.

With all proportions used, the selectivity of the product to Summer Rape is absolute.

In the field, the herbicides according to the invention may be used in the pure state, but most times they will be used in formulations containing, in addition to the active material, liquid or solid carriers and the various adjuvants conventionally used in the pesticide industry.

Details of such formulations form the subject matter of an extensive literature and in particular, the book of Evans, "Weed Control Handbook", 5th edition, Vol. 1, p. 101 et seq.

As regards the proportions to be used, they may vary within wide limits depending on the activity of the compound used, the kind of cleaning to be carried out, the stage of growth of the crop and ill weeds, as well as on the nature of the soil and the atmospheric conditions. Generally, amounts of active material ranging from 0.1 to 20 kg./ha will be suitable, the most usual proportions used ranging from 1 to 8 kg./ha.

The type of treatment should be determined by the nature of the herbicide activity of the compound or compounds used. The compounds of the invention may in particular be used:

either for treatment before sowing (if the herbicide is selective on the crop concerned), or for treatment after the crop has spring up but before the adventitious plants have sprung up (in particular, if the crop withstands quite well treatments carried out after it has spring up), or else, on occasion for treatment after both the crop and the adventitious plants have spring up. As a matter of fact, many of the compounds described in this specification have, when they are used in said way, an appreciable herbicide activity both of Graminae and dicotyledons.

The compounds of the invention may also be used alone or in admixture with other herbicide compounds belonging either to the same chemical family, or to other groups such as substituted ureae, triazines, substituted diphenyl ethers and the like, likely to widen or to complete the activity range of the compounds of the invention. They may also be used together with so called "synergist" products, small proportions of which are adapted to reinforce their action.

Lastly, they may on occasion be used with fungicides, insecticides and nematocides, more particularly with those pesticides which are active on soil parasites in order to carry out a composite treatment in a single operation.

What we claim as new and desire to secure by Letters Patent is:

1. A method of selective crop cleaning which comprises applying a weed-killing amount of an herbicide composition containing at least one compound of the formula,

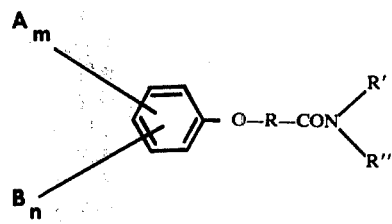

wherein R is a linear or branched alkylene group containing 1 to 5 carbon atoms, R' is hydrogen or an alkyl group containing 1 to 5 carbon atoms, R" is an alkyl group containing 1 to 5 carbon atoms or an alkenyl group containing up to 5 carbon atoms, A is halogen, B is an alkyl group containing 1 to 3 carbon atoms or an halogenated alkyl group containing 1 to 3 carbon atoms and $m$ and $n$ are integers of 0 to 3, $m + n$ being no more than 3 and the substituents A and B being in positions 2, 3, 5 and 6 of the phenyl radical provided that when $n = 1$ and $m = 0$, B is not in position 2.

2. A method according to claim 1 in which R is —CH(CH$_3$)—.

3. A method according to claim 1 in which B is methyl.

4. A method according to claim 1 in which R" is alkenyl containing up to 3 carbon atoms.

5. Method of selective crop cleaning which comprises treating the soil with a weed-killing amount of an herbicide composition, as defined in claim 1, before the crop has emerged.

6. Method of selective crop cleaning which comprises treating the soil with a weed-killing amount of an herbicide composition, as defined in claim 1, after the crop has emerged.

7. A method according to claim 1 in which the amount of said compound in said composition is that which when applied will provide said compound in an amount of from 0.1 to 20 kg./ha.

8. A method of selective crop cleaning which comprises applying a weed-killing amount of an herbicide composition containing at least one compound of the formula,

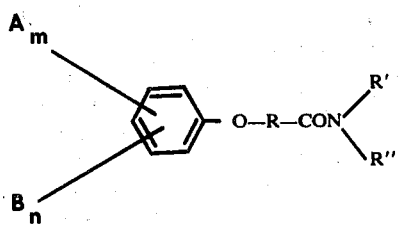

wherein R is an alkylene group containing 1 or 2 carbon atoms,
R' is hydrogen or an alkyl group containing 1 to 5 carbon atoms,
R'' is an alkyl group containing 1 to 5 carbon atoms or an alkenyl group containing up to 5 carbon atoms,
A is halogen,
B is an alkyl group containing 1 to 3 carbon atoms or an halogenated alkyl group containing 1 to 3 carbon atoms and
$m$ and $n$ are integers of 0 to 3, $m + n$ being no more than 3 and the substituents A and B being in positions 2, 3 and 5 of the phenyl radical, provided that when $n = 1$ and $m = 0$, B is not in position 2.

9. A method according to claim 8 in which B is methyl.

10. A method according to claim 8 in which R'' is alkyl containing up to 2 carbon atoms or alkenyl containing up to 3 carbon atoms.

11. A method according to claim 8 in which R contains 2 carbon atoms.

12. A method according to claim 8 in which the amount of said compound in said composition is that which when applied will provide said compound in an amount of 1 to 8 kg./ha.

13. A method according to claim 8 in which R is —CH(CH$_3$)—.

14. A method according to claim 8 in which $n=0$ and A is chlorine.

15. A method in accordance with claim 8 in which $m+n$ equals 2 or 3.

16. Method of selective crop cleaning which comprises treating the soil with a weed-killing amount of an herbicide composition, as defined in claim 8, before the crop has emerged.

17. Method of selective crop cleaning which comprises treating the soil with a weed-killing amount of an herbicide composition, as defined in claim 8, after the crop has emerged.

* * * * *